(12) United States Patent
Stallings et al.

(10) Patent No.: US 9,118,869 B2
(45) Date of Patent: Aug. 25, 2015

(54) VERTICALLY ORIENTED PROGRAM GUIDE FOR MEDIA CONTENT ACCESS SYSTEMS AND METHODS

(75) Inventors: Heath Stallings, Colleyville, TX (US); Brian Roberts, Frisco, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1663 days.

(21) Appl. No.: 11/959,939

(22) Filed: Dec. 19, 2007

(65) Prior Publication Data

US 2009/0164906 A1 Jun. 25, 2009

(51) Int. Cl.
*G06F 3/048* (2013.01)
*H04N 5/445* (2011.01)
*H04N 21/482* (2011.01)
*H04N 21/431* (2011.01)
*H04N 21/443* (2011.01)

(52) U.S. Cl.
CPC ....... *H04N 5/44543* (2013.01); *H04N 21/4312* (2013.01); *H04N 21/4438* (2013.01); *H04N 21/4821* (2013.01)

(58) Field of Classification Search
CPC ............................ G06F 3/048; H04N 5/44543
USPC ............................................. 715/781; 725/39
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |

(Continued)

*Primary Examiner* — Angie Badawi

(57) ABSTRACT

An exemplary system includes a media content processing subsystem configured to provide a program guide graphical user interface having at least a first viewing pane and a second viewing pane to a display for presentation to a user, provide a selector object within the first viewing pane, and provide a list of content channels within the first viewing pane. When one content channel of the list of content channels is located within the selector object, the media content processing subsystem is further configured to provide within the second viewing pane a vertically oriented time axis and a vertically oriented list of at least one media content instance entry corresponding to at least one media content instance available via the one content channel during a time period represented by the time axis.

18 Claims, 13 Drawing Sheets

(56) References Cited

U.S. PATENT DOCUMENTS

| | | |
|---|---|---|
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 6,910,191 B2 * | 6/2005 | Segerberg et al. ............ 715/830 |
| 7,039,935 B2 | 5/2006 | Knudson et al. |
| 7,069,576 B1 | 6/2006 | Knudson et al. |
| 7,076,202 B1 * | 7/2006 | Billmaier ..................... 455/3.04 |
| 7,487,529 B1 | 2/2009 | Orlick |
| 7,644,428 B2 * | 1/2010 | Akiyama ........................ 725/49 |
| 7,685,619 B1 * | 3/2010 | Herz ............................... 725/52 |
| 2001/0029610 A1 * | 10/2001 | Corvin et al. .................... 725/42 |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0124255 A1 | 9/2002 | Reichardt et al. |
| 2002/0129366 A1 * | 9/2002 | Schein et al. ................... 725/43 |
| 2003/0005445 A1 | 1/2003 | Schein et al. |
| 2003/0056219 A1 | 3/2003 | Reichardt et al. |
| 2003/0110495 A1 * | 6/2003 | Bennington et al. ............ 725/41 |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0187943 A1 * | 8/2005 | Finke-Anlauff et al. ..... 707/100 |
| 2005/0216936 A1 | 9/2005 | Knudson et al. |
| 2005/0251824 A1 | 11/2005 | Thomas et al. |
| 2005/0273807 A1 * | 12/2005 | Nissing .......................... 725/32 |
| 2006/0156336 A1 | 7/2006 | Knudson et al. |
| 2006/0212894 A1 | 9/2006 | Knudson et al. |
| 2006/0277574 A1 * | 12/2006 | Schein et al. ................... 725/42 |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2008/0092171 A1 * | 4/2008 | Roberts et al. .................. 725/46 |

* cited by examiner

VERTICALLY ORIENTED PROGRAM GUIDE FOR MEDIA CONTENT ACCESS SYSTEMS AND METHODS

BACKGROUND INFORMATION

The set-top box ("STB") has become an important computing device for accessing media content services and the media content within those services. An STB is usually configured to provide users with access to a large number and variety of media content choices offered by a provider. For example, a user may choose to experience a variety of broadcast television programs, pay-per-view services, video-on-demand programming, Internet services, and audio programming via an STB.

The large number of media content choices offered by providers can make it difficult for a user of an STB to find and select desired media content. On-screen program guides have alleviated this problem to some degree. As the services and media content choices provided to users (e.g., more media channels) have expanded, developers of program guides have attempted to keep pace by expanding the views, features, and capabilities of the program guides.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary vertically oriented program guide systems and methods are disclosed herein. The exemplary systems and methods may provide a capability of accessing one or more media content instances that may be available via one or more content channels. As used herein, the term "media content instance" refers generally to any television program, on demand program, pay-per-view program, broadcast media program, IPTV content, commercial, advertisement, video, movie, song, video game, image, photograph, sound, or any segment, component, or combination of these or other forms of media content that may be viewed or otherwise experienced by a user. The term "content channel" will be used herein to refer generally to any carrier of media content, including, but not limited to, media (e.g., television) channels, streams, addresses, frequencies or other carriers of media content.

The exemplary systems and methods described herein may generally enable a user to easily, effectively, and intuitively access one or more media content instances available via a media content processing subsystem. To this end, an exemplary system includes a media content processing subsystem configured to provide a program guide graphical user interface having at least a first viewing pane and a second viewing pane to a display for presentation to a user. A graphical selector object and a list of content channels may be provided within the first viewing pane. When one of the content channels is selectively located within the selector object, the media content processing subsystem is further configured to provide within the second viewing pane a vertically oriented time axis and a vertically oriented list of at least one or more media content instance entries. The media content instance entries correspond to one or more media content instances available via the content channel located within the selector object during a time period represented by the time axis.

Components and functions of exemplary vertically oriented program guides for media content access systems and methods will now be described in more detail.

Figure 1:
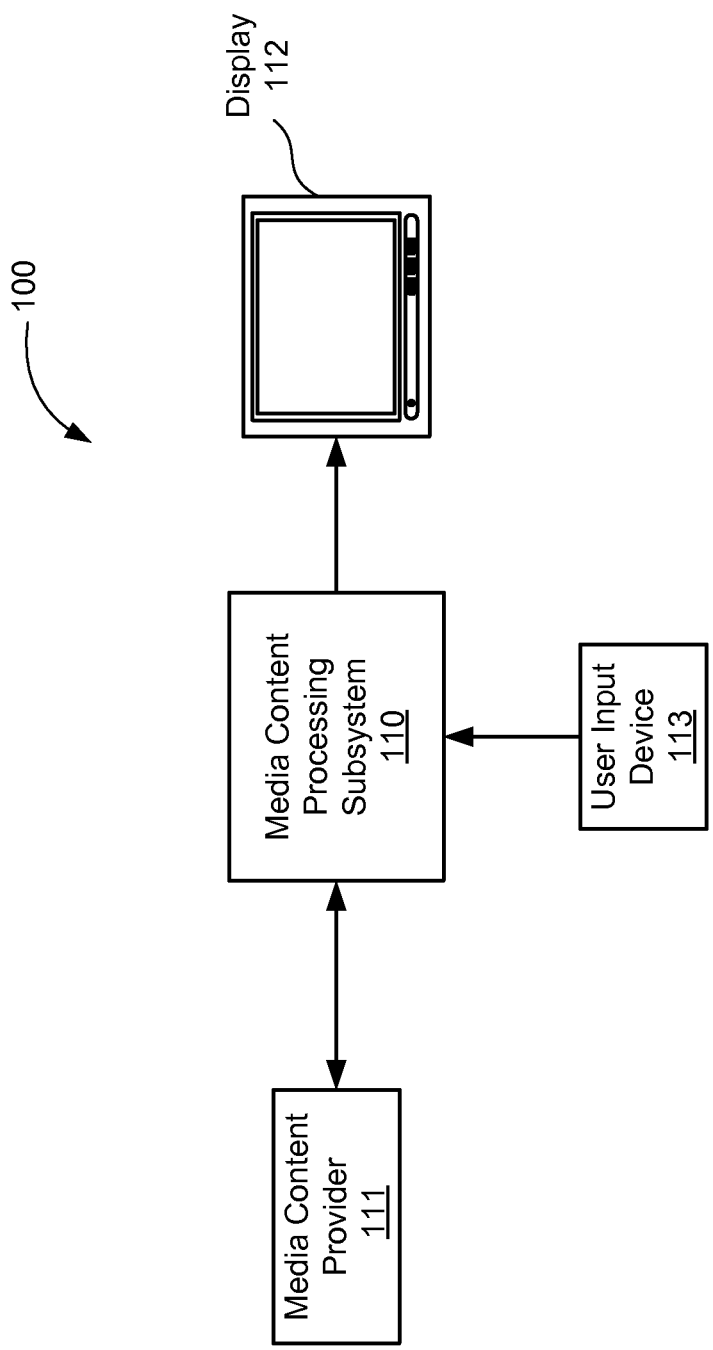
FIG. 1 illustrates an example of a media content access system according to principles described herein.

FIG. 1 illustrates an exemplary media content access system 100 (or simply "system 100"). As shown in FIG. 1, system 100 may include a media content processing subsystem 110, which may be configured to communicate with and receive a signal or data stream containing data representative of media content and/or program guide data from a media content provider 111. Media content processing subsystem 110 and media content provider 111 may communicate using any known communication technologies, devices, networks, media, and protocols supportive of remote data communications, including, but not limited to, cable networks, subscriber television networks, satellite networks, the Internet, intranets, local area networks, wireless networks (e.g., Wi-Fi and/or mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications networks and technologies.

Media content processing subsystem 110 may be configured to process a media content stream provided by media content provider 111, including causing a media content instance, or one or more components (e.g., video and/or audio components) of a media content instance, to be presented for experiencing (e.g., viewing) by a user. Presentation of the media content instance may include, but is not limited to, displaying, playing back, or otherwise processing the media content instance, or one or more components of the media content instance, such that the media content instance may be experienced by the user. For example, media content processing subsystem 110 may provide one or more signals to a display 112 (e.g., a television, computer monitor, mobile phone, handheld device, etc.) so that the display 112 may present (e.g., display) media content for experiencing by the user.

As shown in FIG. 1, and as will be described in more detail below, media content processing subsystem 110 may be at least partially controlled by a user input device 113 (e.g., a remote control device). In certain examples, user input device 113 may include input mechanisms by which a user can utilize features and/or services provided by media content processing subsystem 110. For example, a user may utilize user input device 113 to navigate within various interactive GUIs that may be provided by media content processing subsystem 110.

While an exemplary media content access system 100 is shown in FIG. 1, the exemplary components illustrated in FIG. 1 are not intended to be limiting. Additional or alternative components and/or implementations may be used. Components of system 100 will now be described in additional detail.

Media content provider 111 may be configured to provide various types of media content and/or program guide data to media content processing subsystem 110 using any suitable communication technologies, including any of those disclosed herein. The media content may include one or more media content instances, or one or more segments of the media content instance(s).

The program guide data may include any information descriptive of content channels, programming time slots, media content instances, metadata for the media content instances, and relationships between the content channels, time slots, and media content instances. The term "programming time slot" or simply "time slot" will be used herein to refer generally to any period of time associated with a scheduled transmission (e.g., broadcast) of media content. Typically, the program guide data is descriptive of a programming schedule, including media content instances and the time slots and content channels associated with scheduled transmissions of the media content instances. Examples of program guide GUIs configured to present program guide data will be described in more detail below.

Figure 2:
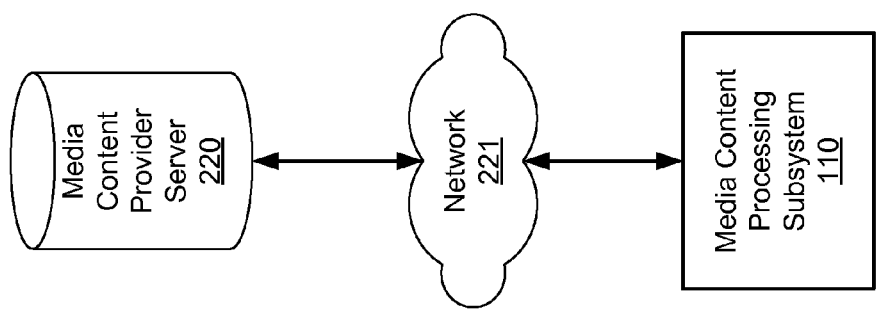
FIG. 2 illustrates an exemplary media content provider network according to principles described herein.

An exemplary media content provider 111 may include a media content provider server 220, as shown in FIG. 2. Media content provider server 220 may be configured to communicate with media content processing subsystem 110 via a network 221 (and communications links thereto). Network 221 shown in FIG. 2 may include, but is not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo network), an optical fiber network, any other suitable network, and any combination or sub-combination of these networks. In some alternative examples, media content processing subsystem 110 may be connected directly to media content provider server 220.

Figure 3:
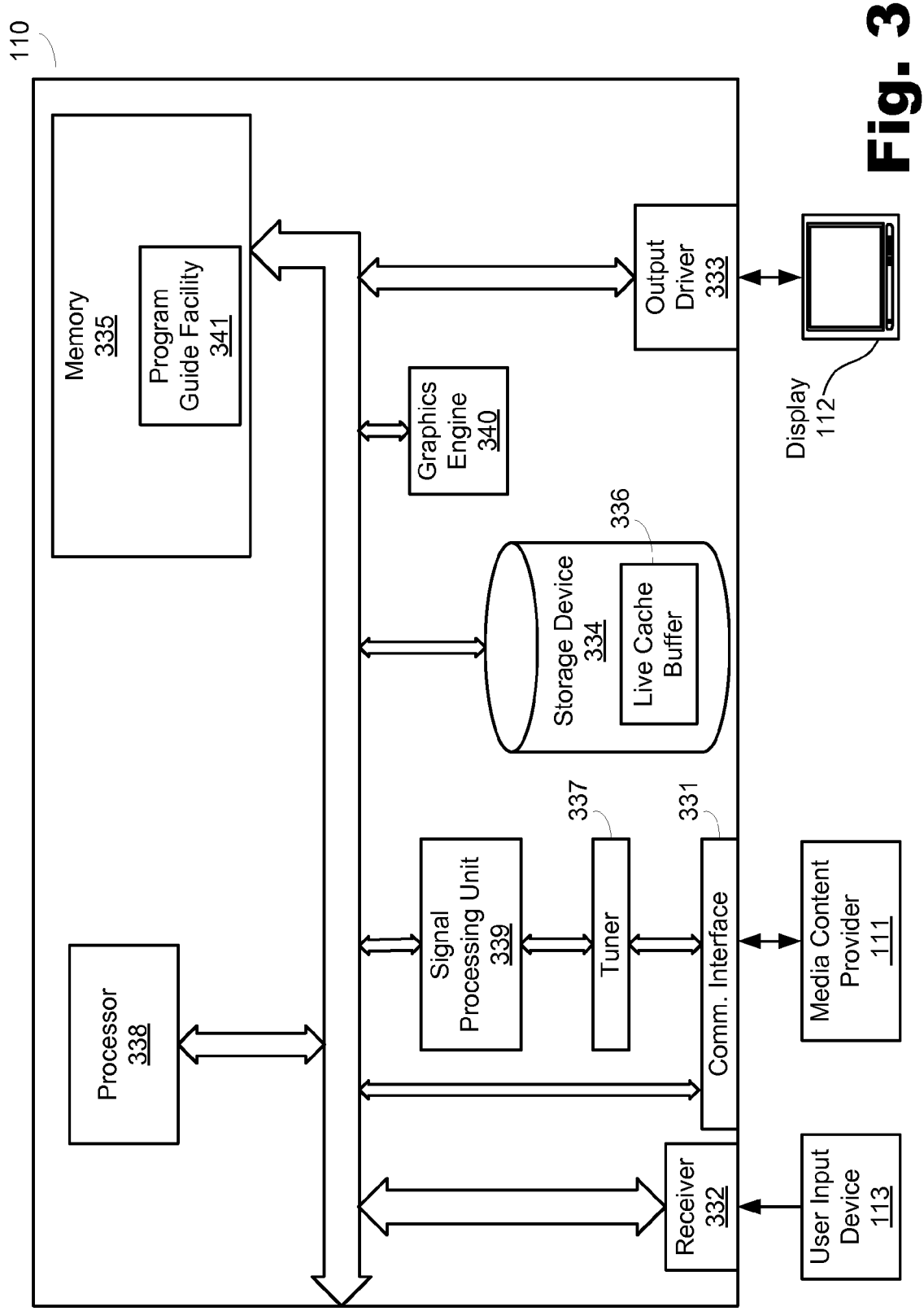
FIG. 3 illustrates an exemplary media content processing subsystem according to principles described herein.

FIG. 3 illustrates exemplary components of media content processing subsystem 110 (or simply "processing subsystem 110"). Processing subsystem 110 may include any hardware, software, and firmware, or combination or sub-combination thereof, configured to process media content and/or program guide data for presentation to a user. The media content and/or program guide data may be received from media content provider 111 and provided to display 112 for presentation to the user. As used herein and in the appended claims, unless otherwise specifically denoted, the terms "media content processing subsystem" and "processing subsystem" refer expansively to all possible receivers configured to receive and process digital and/or analog media content, as well as program guide data. Processing subsystem 110 may include, but is not limited to, a set-top box ("STB"), a home communication terminal ("HCT"), a digital home communication terminal ("DHCT"), a stand-alone personal video recorder ("PVR"), a DVD player, a handheld entertainment device, a gaming device, a video-enabled phone (e.g., a mobile phone), a wireless device, a touch screen device, and a personal computer.

In certain embodiments, processing subsystem 110 may include any computer hardware and/or instructions (e.g., software), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of computing devices, and may employ any of a number of computer operating systems, including, but by no means limited to, known versions and/or varieties of Microsoft Windows, UNIX, Macintosh, and Linux operating systems.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Additional or alternative components and/or implementations may be used in other embodiments. Components of the processing subsystem 110 will now be described in additional detail.

As shown in FIG. 3, processing subsystem 110 may include a communication interface 331 configured to receive content (e.g., media content) and/or data (e.g., program guide data) in any acceptable format from media content provider 111 or from any other suitable content source. Communication interface 331 may include any device, logic, and/or other technologies suitable for receiving signals and/or data representative of media content and/or other types of content or data. Communication interface 331 may be configured to interface with any suitable communication media, protocols, and formats, including any of those mentioned above.

Processing subsystem 110 may also include a receiver 332 configured to receive user input signals (e.g., navigation input commands) from user input device 113. An exemplary user input device 113 will be described in more detail below.

Processing subsystem 110 may also include an output driver 333 configured to interface with or drive display 112. As instructed by one or more processors of the processing subsystem 110, output driver 333 may provide output signals to display 112, the output signals including content (e.g., media content and/or GUI content) to be presented by display 112 for experiencing by a user. For example, output driver 333 may provide one or more interactive GUIs to display 112 for presentation to the user. Output driver 333 may include any combination of hardware, software, and/or firmware as may serve a particular application.

Storage device 334 may include one or more data storage media, devices, or configurations and may employ any type, form, and combination of storage media. For example, storage device 334 may include, but is not limited to, a hard drive, network drive, flash drive, magnetic disc, optical disc, or other non-volatile storage unit. Media content, program guide data, and/or other data may be temporarily and/or permanently stored in storage device 334.

Storage device 334 is shown to be a part of the processing subsystem 110 in FIG. 3 for illustrative purposes only. It will be understood that storage device 334 may additionally or alternatively be located external to processing subsystem 110.

Processing subsystem 110 may include memory 335. Memory 335 may include, but is not limited to, FLASH memory, random access memory ("RAM"), dynamic RAM ("DRAM"), other suitable computer-readable media, or any combination or sub-combination thereof. In some examples, various facilities or applications (e.g., program guide facility 341) used by the processing subsystem 110 may reside in memory 335.

Storage device 334 may include one or more live cache buffers 336. Live cache buffer 336 may additionally or alternatively reside in memory 335 or in a storage device external to processing subsystem 110. In some examples, media content and/or program guide data may be temporarily stored in live cache buffer 336 to facilitate viewing of the media content.

Tuner 337 may be configured to selectively receive content (e.g., media content) carried on a particular content channel. For example, tuner 337 may be tuned to a particular content channel such that the content carried on the content channel is received and processed by processing subsystem 110.

In some examples, processing subsystem 110 may include multiple tuners 337 such that content carried on different content channels may be concurrently received by the processing subsystem 110. For example, processing subsystem 110 may include a first tuner configured to receive content carried on an analog video signal and a second tuner configured to simultaneously receive content carried on a digital compressed signal.

In some examples, media content received at the tuner 337 is temporarily buffered, or stored, in the live cache buffer 336. If there are multiple tuners 337, there may be a live cache buffer 336 corresponding to each of the tuners 337.

While tuner 337 may be used to receive various types of content-carrying signals broadcast by media content provider 111, processing subsystem 110 may be configured to receive other types of content signals (including media content signals) from media content provider 111 and/or other sources without using a tuner. For example, media content provider 111 may broadcast digital streams of data packets (e.g., Internet Protocol ("IP") based data packets) that can be received without using a tuner. For such types of content signals, communication interface 331 may receive and forward the signals directly to other components of processing subsystem 110 (e.g., processor 338 or signal processing unit 339) without the signals going through tuner 337. For an IP-based signal, for example, signal processing unit 339 may function as an IP receiver.

Processing subsystem 110 may include at least one processor, such as processor 338, configured to control operations of processing subsystem 110. Processing subsystem 110 may also include a signal processing unit 339 configured to process incoming media content. Signal processing unit 339 may be configured, for example, to demodulate and parse encoded digital media content. In some examples, processing subsystem 110 may include one or more signal processing units 339 corresponding to each of the tuners 337. Program guide data received from the media content provider 111 may be processed by signal processing unit 339, processor 338, and/or any other suitable component(s) of processing subsystem 110.

Processing subsystem 110 may include a graphics engine 340 configured to generate graphics that can be displayed by the display 112. The graphics may include graphical user interfaces such as, but not limited to, one or program guide GUIs and/or any other graphics as may serve a particular application.

One or more facilities (e.g., software applications) residing within processing subsystem 110 may be executed upon initiation by a user of the processing subsystem 110, or upon the occurrence of another predetermined event. The facilities may reside in memory 335 or in any other area of the processing subsystem 110 and be executed by processor 338.

As shown in FIG. 3, processing subsystem 110 may include a program guide facility 341, which may reside in memory 335. Program guide facility 341 may be configured to instruct one or more components of processing subsystem 110 (e.g., processor 338 and/or graphics engine 340) to generate and provide data representative of a program guide GUI. Processing subsystem 110 may provide the program guide GUI to display 112 for presentation to a user.

As mentioned, one or more operations of processing subsystem 110 may be controlled by user input device 113. User input device 113 may include a remote control, keyboard, or any other suitable input device and may be configured to communicate with receiver 332 via a wireless link (e.g., an infrared ("IR") or radio frequency ("RF") link), electrical connection, or any other suitable communication link.

Figure 4:
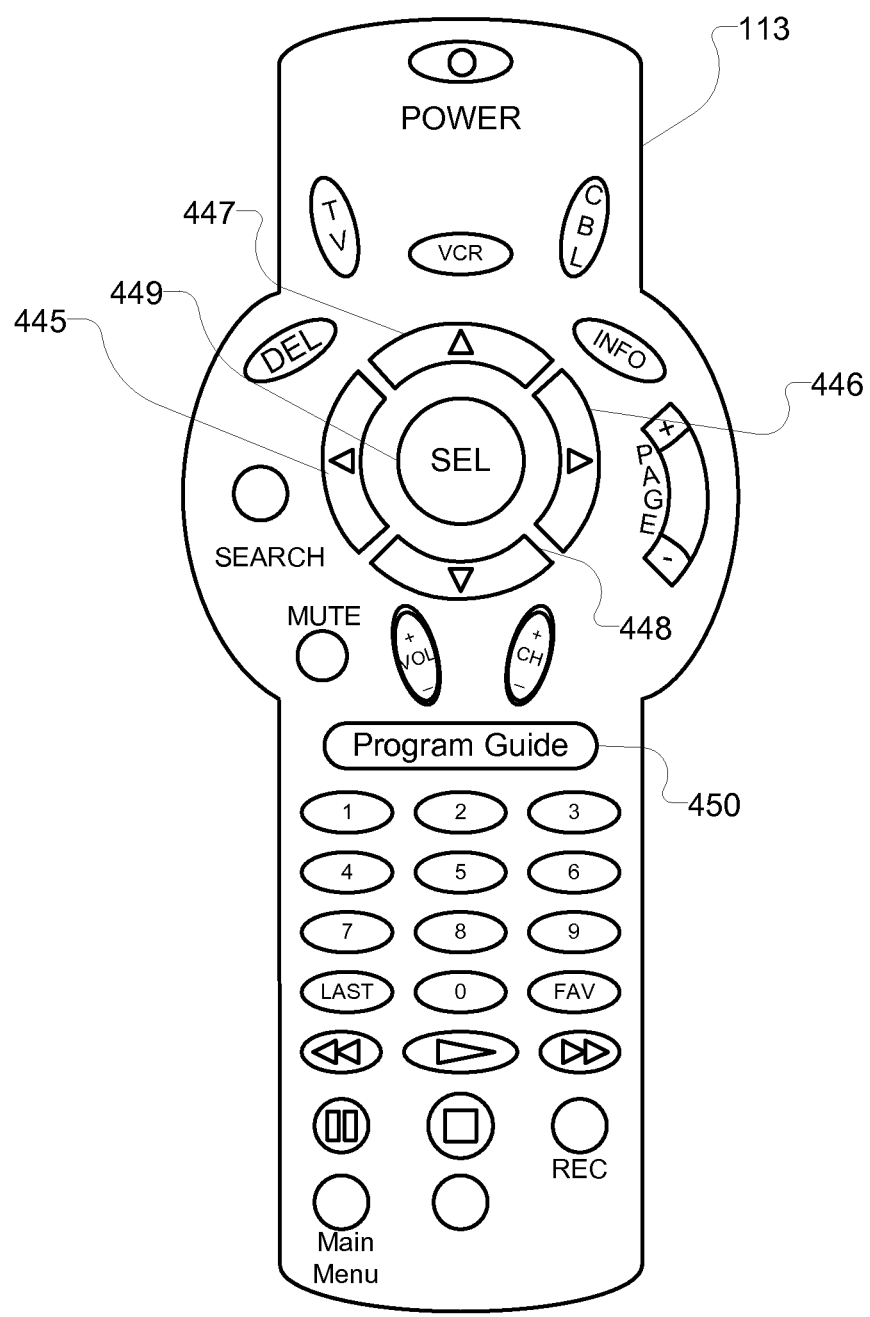
FIG. 4 illustrates an exemplary remote control user input device according to principles described herein.

An exemplary remote control user input device 113 is illustrated in FIG. 4. In some examples, input device 113 may be configured to enable a user to control viewing options for experiencing media content via processing subsystem 110. Navigation buttons (e.g., left button 445, right button 446, up button 447, and down button 448) and a select button 449 may be included and configured to enable the user to evoke and/or navigate through various views, options, and graphical user interfaces displayed by display 112. For example, buttons 445-449 may be configured to enable a user to utilize tools for navigating to different locations in a program guide GUI.

A program guide button 450 may be configured to evoke a presentation of a program guide GUI on display 112. In some examples, selection of program guide button 450 is configured to launch or execute program guide facility 341. Program guide facility 341 may then instruct processor 338 and/or graphics engine 340 to generate a program guide GUI.

It will be recognized that input device 113 shown in FIG. 4 is merely illustrative of the many different types of user input devices that may be used to in connection with processing subsystem 110.

Figure 5:
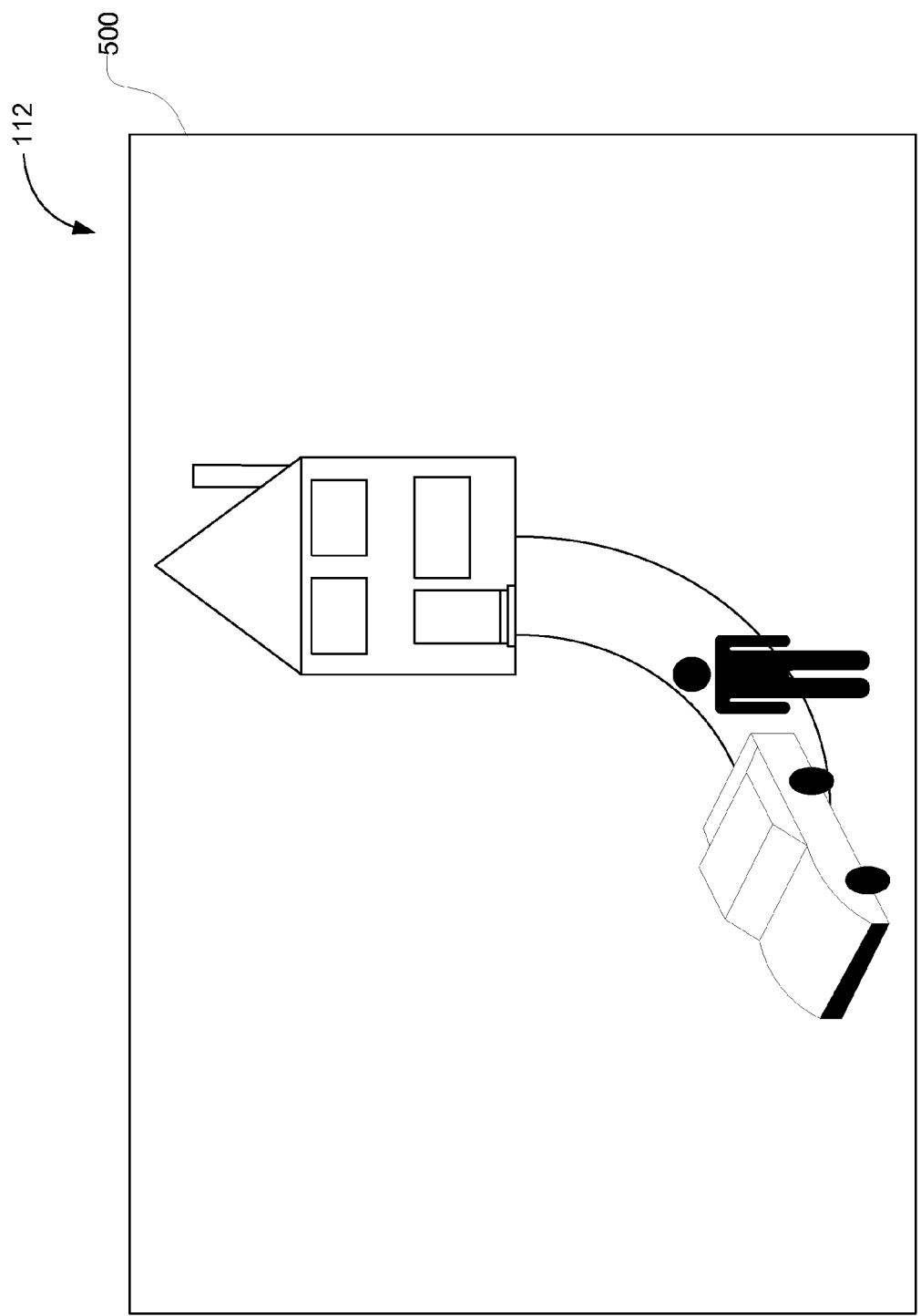
FIG. 5 illustrates a viewing area of an exemplary display device with a particular scene or frame of a media content instance displayed thereon according to principles described herein.

FIG. 5 illustrates a viewing area or screen 500 of an exemplary display 112 with a particular scene or frame of a media content instance displayed thereon. In some examples, the user may be interested in experiencing a different media content instance and/or viewing information related to one or more other media content instances.

Figure 6:
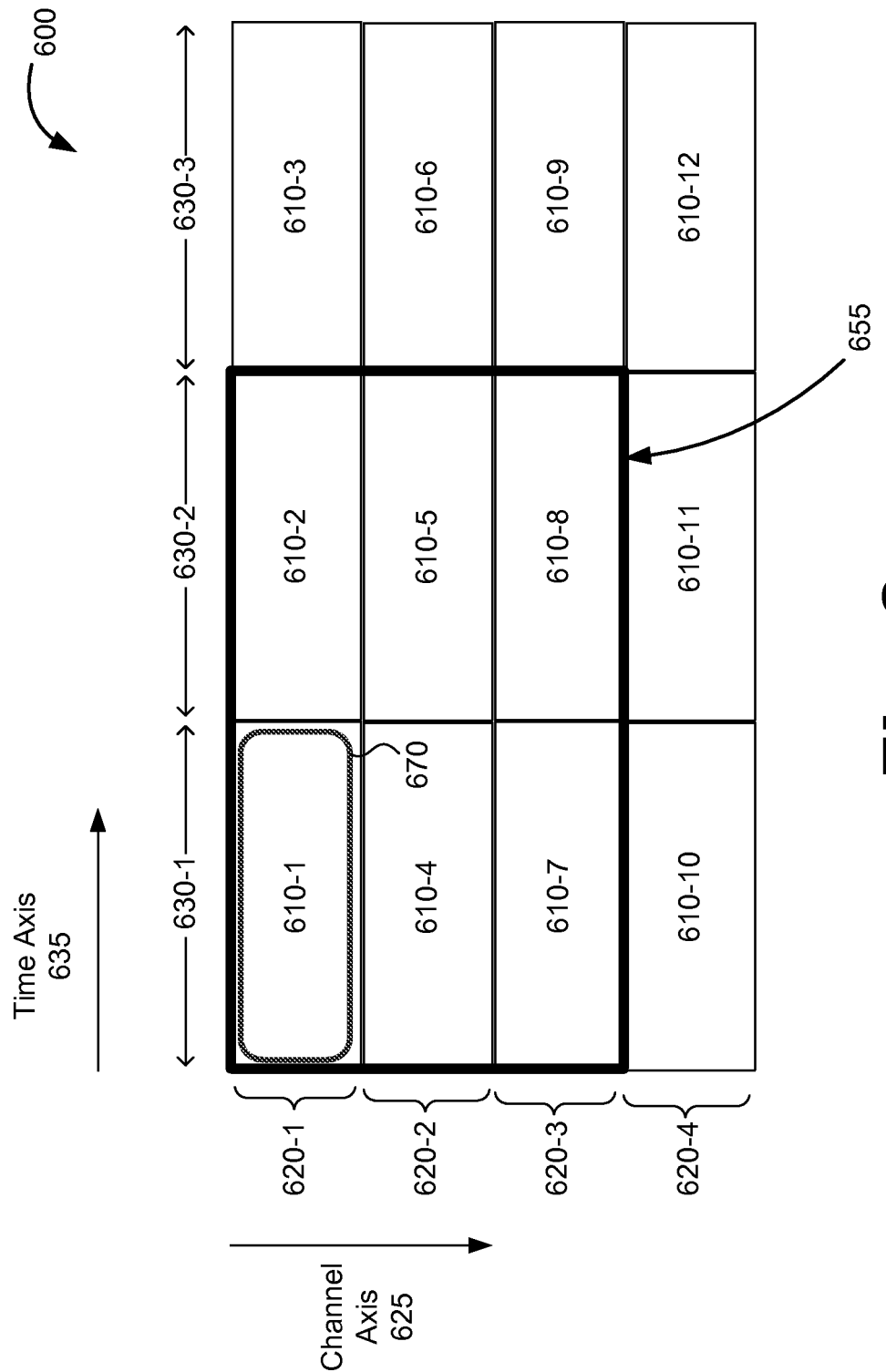
FIG. 6 illustrates a viewing area representing a particular view of a program guide that may be presented to a user according to principles described herein.

To this end, media content processing subsystem 110 may be configured to provide a program guide to display 112 for presentation to a user. FIG. 6 illustrates an exemplary program guide 600 that may be generated and provided by processing subsystem 110. As shown in FIG. 6, program guide 600 may include a matrix of cells 610-1 through 610-12 (collectively "cells 610"). Cells 610 may be associated with respective media content instances and related metadata and programming information. In certain embodiments, for example, any particular cell 610 may be associated with a media content instance. For instance, cell 610-1 may be associated with a television program titled "DALLAS."

The cells 610 may be arranged in a program guide matrix based on attributes of the cells and/or the associated media content instances. For example, the cells 610 may be arranged in a matrix based on content channels carrying the corresponding media content instances and time slots representing the time periods during which the media content instances are scheduled for transmission. As shown in FIG. 6, content channels 620-1 through 620-4 (collectively "content channels 620") may be arranged along a channel axis 625, and time slots 630-1 through 630-3 (collectively "time slots 630") may be arranged along a time axis 635 to form a matrix grid of cells 610.

In program guide 600, any particular cell 610 may be associated with a content channel and one or more time slots respectively indicative of the content channel carrying the corresponding media content instance and the time period during which the media content instance is scheduled for transmission. As an example, the position of cell 610-1 in the program guide matrix represents that the corresponding media content instance (e.g., a television program titled "DALLAS") is scheduled to be transmitted on content channel 620-1 during time slot 630-1. Accordingly, the cells 610 may be arranged in the matrix grid based on content channels 620 and time slots 630.

A user may view different portions of a program guide, and only a portion of a program guide is typically included in any one view presented to a user. FIG. 6 illustrates a viewing area 655 representing a particular view of program guide 600 that may be presented to a user. As shown, cells 610-1, 610-2, 610-4, 610-5, 610-7, and 610-8 are included in viewing area 655, and cells 610-3, 610-6, 610-9, 610-10, 610-11, and 610-12 are outside of the viewing area 655. The particular cells 610 included in the viewing area 655 in FIG. 6 are associated with content channels 620-1, 620-2, and 620-3, and with time slots 630-1 and 630-2.

In the example shown in FIG. 6, the channel axis 625 is vertically oriented and the time axis 635 is horizontally oriented. In other words, content channels 620 are arranged from top to bottom of viewing area 655 as viewed by a user and time slots 630 are arranged from left to right of viewing area 655 as viewed by a user.

However, the arrangement of the program guide matrix shown in FIG. 6 may in certain applications limit the amount of information that may be displayed for each media content instance. Moreover, navigation between various cells 610 within the program guide matrix may not be intuitive for some users.

To this end, a vertically oriented or calendar view program guide may be provided by media content processing subsystem 110 to display 112 for presentation to a user. The terms "vertically oriented program guide" and "calendar view program guide" will be used interchangeably herein to refer to a program guide having at least a time axis and a list of media content entries that are vertically oriented. As will be described in more detail below, the calendar view program guide may provide intuitive access to program information corresponding to one or more media content instances and contextually seamless integration into other features of processing subsystem 110.

Figure 7:
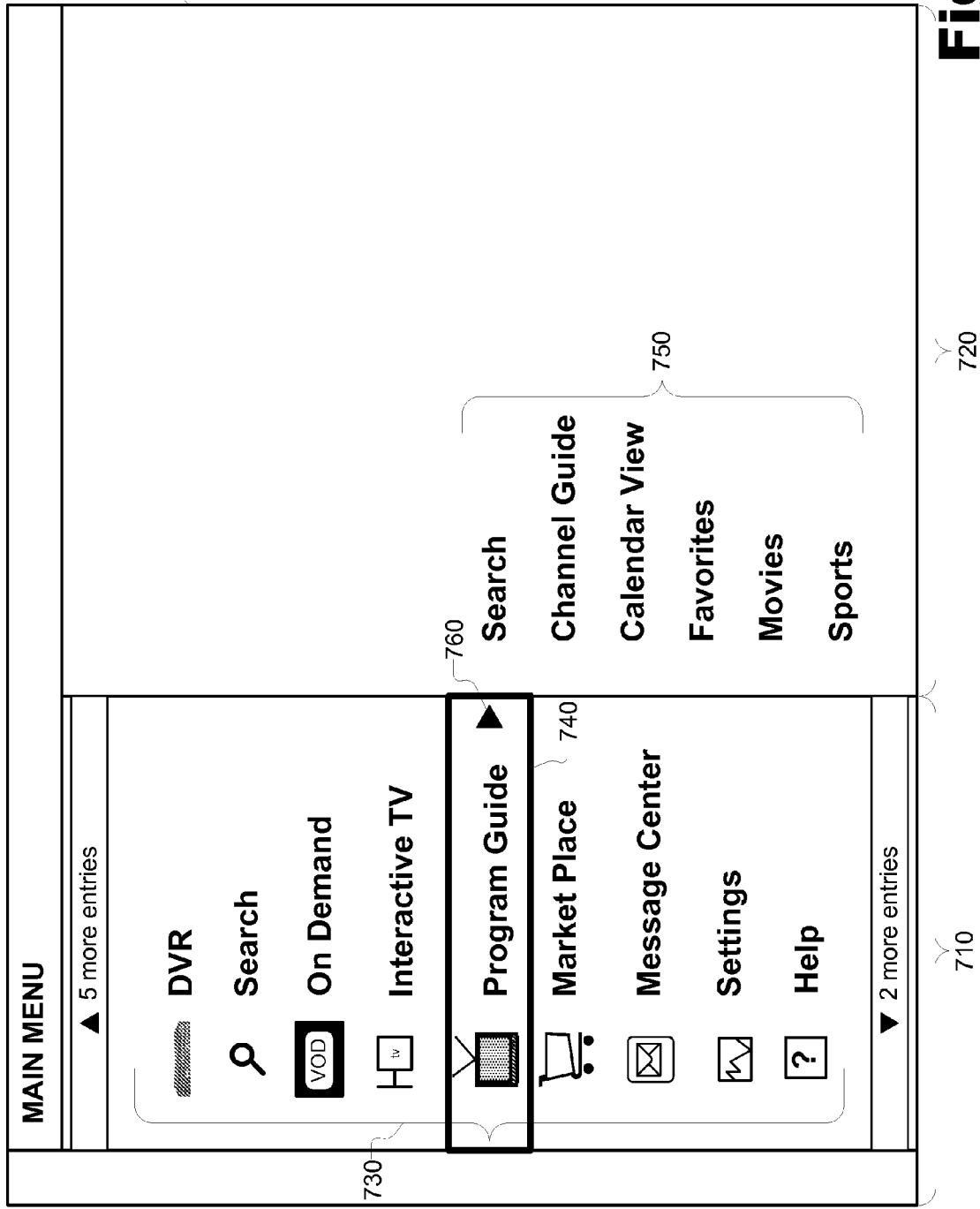
FIG. 7 illustrates an exemplary main menu graphical user interface ("GUI") according to principles described herein.

FIG. 7 illustrates an exemplary main menu GUI 700 that may be presented by processing subsystem 110 and that may be used to access a calendar view program guide. Calendar view program guide may additionally or alternatively be accessed using a number of different methods. For example, the user may select a dedicated button on user input device 113 (e.g., program guide button 450).

As shown in FIG. 7, main menu GUI 700 may include two interactive viewing panes, labeled 710 and 720 respectively. It will be recognized that main menu GUI 700 may alternatively include any other number of viewing panes as may serve a particular application. In some examples, as will be described in more detail below, the contents of second viewing pane 720 may be dynamically updated to display various entries related to a selected entry within first viewing pane 710.

As shown in FIG. 7, first viewing pane 710 may include a main menu listing 730 of selectable entries. Each entry within main menu listing 730 may correspond to a directory of one or more other options that may be accessed via processing subsystem 110. For example, main menu listing 730 may include entries configured to allow access to one or more of the following options or features: digital video recording ("DVR") options, search options, on demand programming options, interactive television options, program guide options, shopping options, messaging and communication options, settings, and help options. It will be recognized that main menu listing 730 may include additional or alternative entries as may serve a particular application. For example, one or more customized entries may be included within main menu listing 730 such as, but not limited to, a directory containing personalized media content (e.g., photos, music, videos, games, and contacts).

In some examples, a user may navigate through main menu listing 730 with the up and down navigation buttons 447 and 448, for example, and select a desired entry by pressing a designated selection button (e.g., right navigation button 446) when the desired entry is located within a graphical "selector object" 740. As used herein, the term "selector object" 740 may refer to a graphical object within a viewing pane (e.g., first viewing pane 710) that is configured to distinguish a particular entry within a list from the other entries within the list. For example, as shown in FIG. 7, selector object 740 may include a distinguishing border. The selector object 740 may additionally or alternatively include a distinct color, magnification, brightness, size, and/or any other distinguishing feature. It will be assumed herein for illustrative purposes that the selector object 740 is a distinguishing border configured to surround a particular entry within a list.

The selector object 740 may be configured to remain stationary in relation to the scrolling main menu listing 730. Hence, as a user scrolls up or down through main menu listing 730 of selectable entries, the entry directly above or below selector object 740 moves into selector object 740.

In some alternative examples, selector object 740 is configured to move up and down in response to user input. For example, if a user presses the up navigation button 447, selector object 740 may be configured to move up to select an entry directly above a currently selected entry.

As shown in FIG. 7, a contextual view of content related to the entry that is located within selector object 740 may be displayed within second viewing pane 720. For example, a content list 750 containing one or more selectable entries that are related to the entry that is located within selector object 740 may be displayed within second viewing pane 720.

Hence, second viewing pane 720 is configured to display a "preview" of content related to a particular entry located within selector object 740 before the entry is selected by the user. It will be recognized that the contextual view displayed within second viewing pane 720 may alternatively include other types of content.

To illustrate, FIG. 7 shows a content list 750 located within second viewing pane 720 that is related to the "Program Guide" entry in the first viewing pane 710. Content list 750 may include entries representing different options within a program guide that may be provided by processing subsystem 110. For example, one of the entries shown within content list 750 represents a "calendar view" option. The calendar view option will be described in more detail below.

A user may select a desired entry within main menu listing 730 by pressing a designated selection button (e.g., right navigation button 446) when the desired entry is located within selector object 740. A graphical object 760 may be displayed next to the entry to graphically indicate to the user that the entry may be selected by pressing the designed selection button. For example, graphical object 760 may be in the form of a right arrow to indicate that the right navigation button 446 may be pressed to select a particular entry within selector object 740. It will be recognized that graphical object 760 may include any type of graphic as may serve a particular application.

Hence, to select a calendar view program guide, a user may first selectively locate the "Program Guide" entry within selector object 740, as shown in FIG. 7. The user may then press a designated selection button (e.g., right navigation button 446) to select the "Program Guide" entry.

Figure 8:
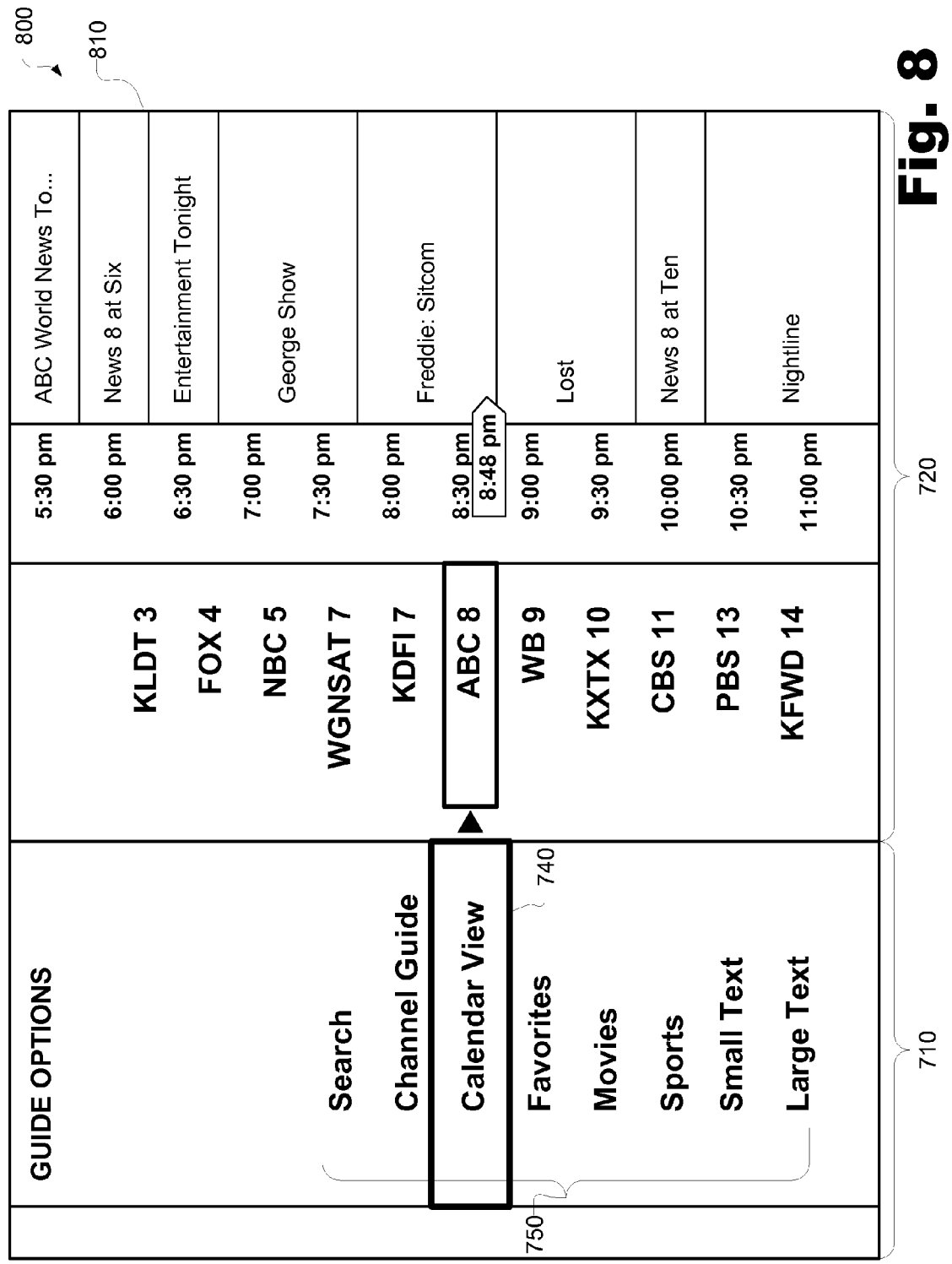
FIG. 8 shows an exemplary GUI that may be displayed after a "Program Guide" entry within the main menu GUI of FIG. 7 has been selected according to principles described herein.

FIG. 8 shows an exemplary GUI 800 that may be displayed after the "Program Guide" entry has been selected. As shown in FIG. 8, content list 750 has been moved to first viewing pane 710. With the "calendar view" entry located within selector object 740, processing subsystem 110 may be configured to provide a preview of at least a portion of a calendar view program guide 810 within second viewing pane 720. As shown in FIG. 8, and as will be described in more detail below, the calendar view program guide 810 may include a vertically oriented list of content channels, a vertically oriented time axis, and a vertically oriented list of entries representing one or more media content instances.

With the "calendar view" entry located within selector object 740, the user may press a designated selection button (e.g., right navigation button 446) to select the "calendar view" entry and cause processing subsystem 110 to provide a program guide GUI having another view of the calendar view program guide displayed therein.

Figure 9:
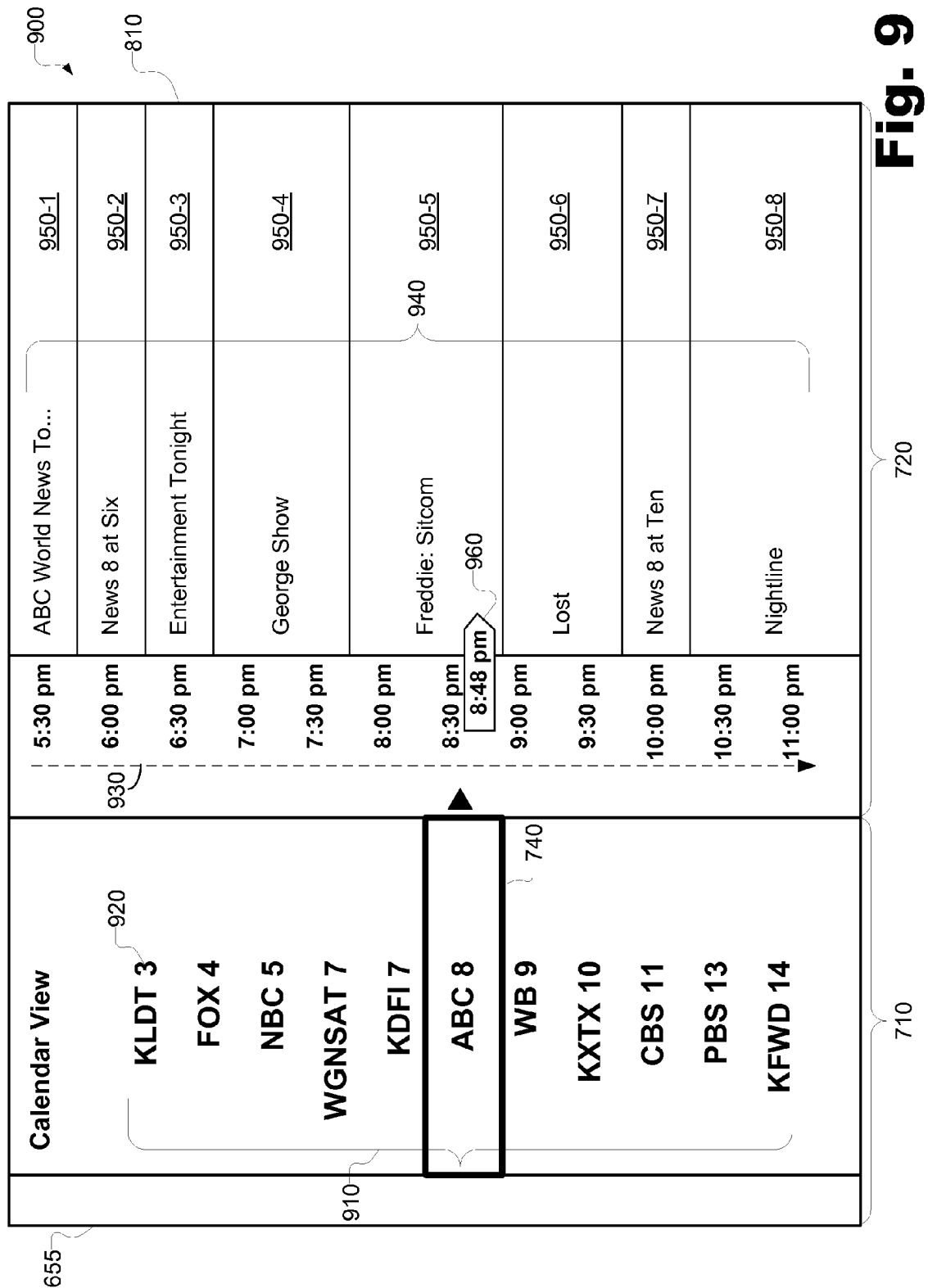
FIG. 9 illustrates an exemplary program guide GUI configured to display at least a portion of calendar view program guide according to principles described herein.

FIG. 9 illustrates an exemplary program guide GUI 900 configured to display another view of at least a portion of calendar view program guide 810 within viewing area 655. As shown in FIG. 9, a list of content channels 910 may be displayed within first viewing pane 710. Each content channel entry within list 910 represents a distinct content channel.

As shown in FIG. 9, the content channel list 910 is vertically oriented. In FIG. 9, the list 910 is arranged from top to bottom as viewed by a user.

Each content channel entry within list 910 may include any combination of text and/or graphics to represent its respective content channel. For example, content channel entry 920 may include text "KLDT 3" to represent a particular content channel so named. One or more logos, colors, and/or other graphics may additionally or alternatively be included within a content channel entry to represent a particular content channel as may serve a particular application.

Any number of content channels may be included within list 910 as may serve a particular application. For example, content channel list 910 may include one or more content channels available via processing subsystem 110.

In some examples, content channel list 910 is configured to scroll up and down to display additional or alternative content channels within first viewing pane 710 in response to user input. For example, a user may press up and down navigation buttons 447 and 448 to selectively display additional or alternative content channels within first viewing pane 710.

Selector object 740 may also be included within first viewing pane 710. In some examples, selector object 740 may be configured to remain stationary in relation to the content channel list 910. Alternatively, selector object 740 may be configured to move up and down in response to user input.

In some examples, a content channel within content channel list 910 may be selectively located within selector object. In response, program guide information corresponding to that content channel may be displayed within second viewing pane 720. Exemplary program guide information that may be displayed within second viewing pane 720 will be described in more detail below.

Figure 10:
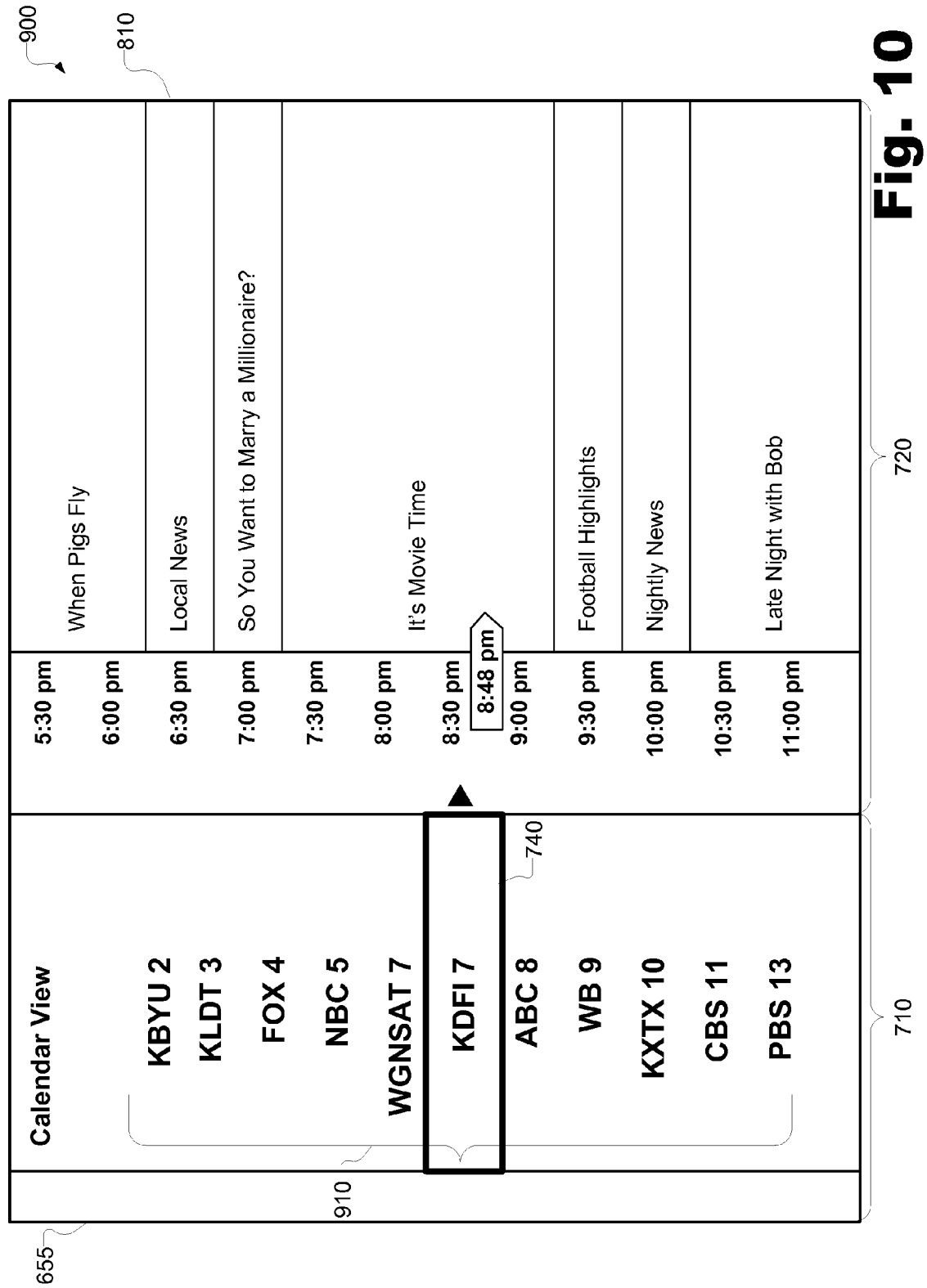
FIG. 10 shows the program guide GUI after a particular content channel is selectively located within a selector object according to principles described herein.

For example, a content channel labeled "ABC 8" is located within selector object 740 in FIG. 9. Hence, program guide information corresponding to content channel "ABC 8" is displayed within second viewing pane 720. To display program guide information corresponding to a different content channel within second viewing pane 720, a user may selectively locate the desired content channel within selector object 740. For example, FIG. 10 shows the program guide GUI 900 with content channel "KDFI 7" selectively located within selector object 740. As shown in FIG. 10, the contents displayed within second viewing pane 720 have been updated to correspond to content channel "KDFI 7."

Returning to FIG. 9, the program guide information displayed within second viewing pane 720 may include a vertically oriented time axis (represented by dashed line 930) and a vertically oriented list 940 of entries representing one or more media content instances. Each of these will be described in more detail below.

As shown in FIG. 9, time axis 930 may include a number of time slots. One or more descriptive labels (e.g., 5:30 pm, 6:00 pm, etc.) may be used to label each of the time slots. The time slots represent time periods during which the media content instances displayed within list 940 are scheduled for transmission via the content channel located within selector object 740 (e.g., ABC 8).

In some examples, the amount of time represented by time axis 930 is user-definable. To illustrate, time axis 930 shown in FIG. 9 is configured to display half-hour time slots within a time frame of 5:30 pm to 11:30 pm. Alternative amounts of time may be displayed within time axis 930 as may serve a particular application and/or as may be defined by a user. As an example, a user may define the time axis 930 to display a four hour time frame.

As shown in FIG. 9, list 940 may include one or more entries representing one or more media content instances scheduled for transmission during the time slots included within time axis 930. In some examples, each media content instance entry may be included within its own graphical block or cell (e.g., blocks 950-1 through 950-8, collectively referred to as "blocks 950"). Each block 950 may be vertically sized to graphically correspond to the time slot(s) within which the media content instances are scheduled for transmission.

For example, block 950-1 includes a media content instance entry labeled "ABC World News Tonight." The vertical size of block 950-1 is configured to span a half-hour time slot of 5:30 pm to 6:00 pm to indicate that media content instance "ABC World News Tonight" is scheduled for transmission between 5:30 pm to 6:00 pm.

In some examples, a current time indicator 960 may be provided to graphically represent a current time. Current time indicator 960 may include any graphical object as may serve a particular application and may be configured to indicate a current time to a user. For example, current time indicator 960 shown in FIG. 9 shows that the current time is 8:48 pm. In some embodiments, current time indicator 960 is configured to move vertically along time axis 930 as the current time changes.

In some examples, one or more colors, shading, and/or other graphics may be used to distinguish blocks 950 corresponding to media content instances that have already been transmitted prior to the current time, as indicated by current time indicator 960, from blocks 950 corresponding to media content instances that are scheduled to be transmitted after the current time. For example, blocks 950-1 through 950-4 and part of block 950-5 may be shaded or otherwise distinguished from the remaining blocks 950 to graphically indicate that their corresponding media content instances have already been at least partially transmitted.

In some examples, a user may desire to view or otherwise access one or more media content instance entries within list 940 that are not currently viewable within viewing area 655. For example, a user may desire to view media content entries transmitted via content channel "ABC 8" during time slots prior to 5:30 pm or after 11:30 pm. To this end, the user may press a designated selection button (e.g., right navigation button 446) when content channel "ABC 8" is located within selector object 740.

Figure 11:
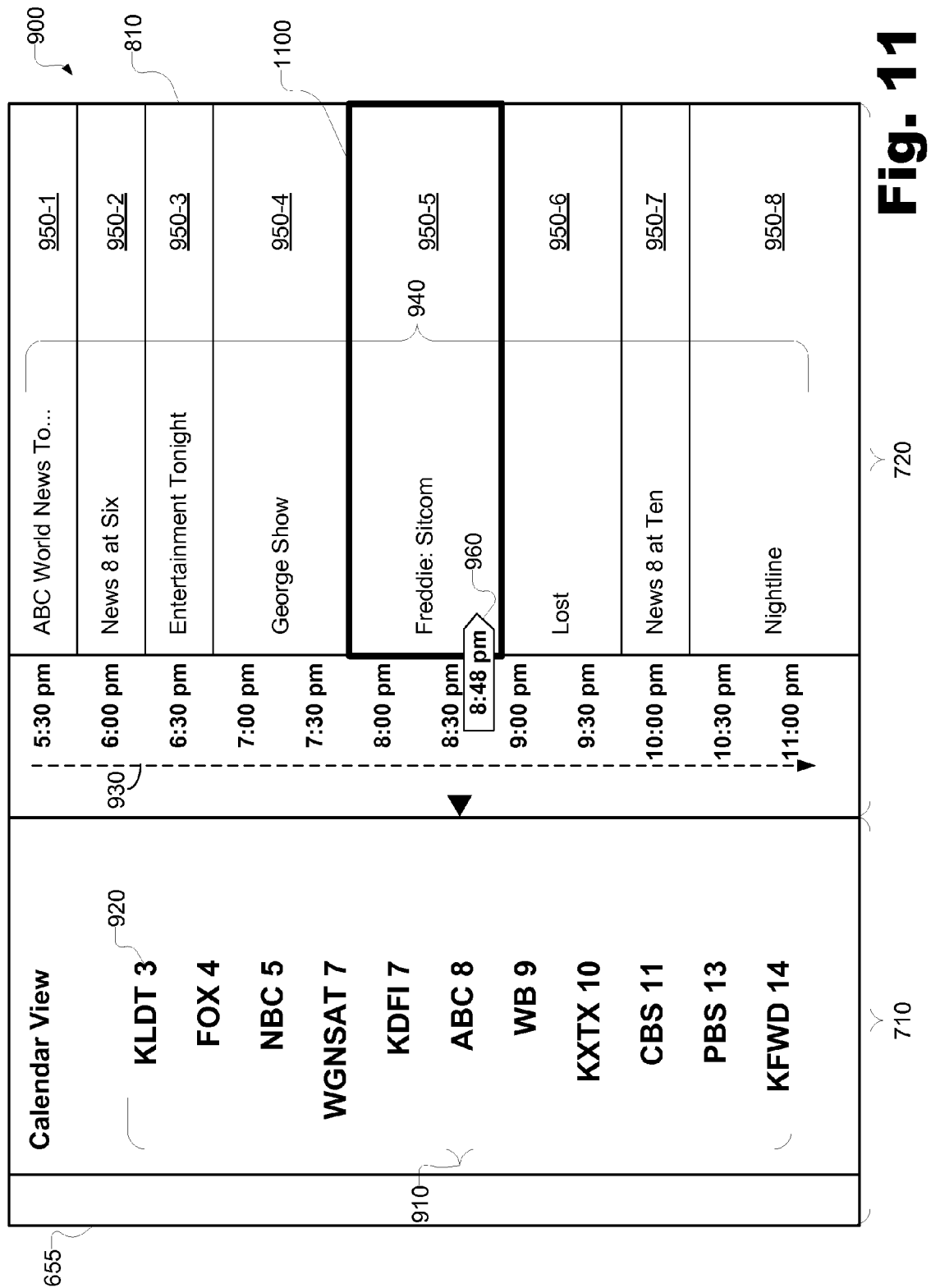
FIG. 11 shows the program guide GUI after a content channel is selected according to principles described herein.

FIG. 11 shows program guide GUI 900 after content channel "ABC 8" shown in FIG. 9 has been selected. As shown in FIG. 11, a selector object 1100 may be provided within second viewing pane 720. Selector object 1100 may be similar to selector object 740 described above, and may be configured to surround, magnify, highlight, or otherwise distinguish a particular media content instance block 950.

In some examples, media content instance list 940 may be scrolled up and down through selector object 1100. Alternatively, selector object 1100 may be configured to move up and down in response to user input. In this manner, additional time slots and entries within list 940 may be displayed within second viewing pane 720.

Figure 12:
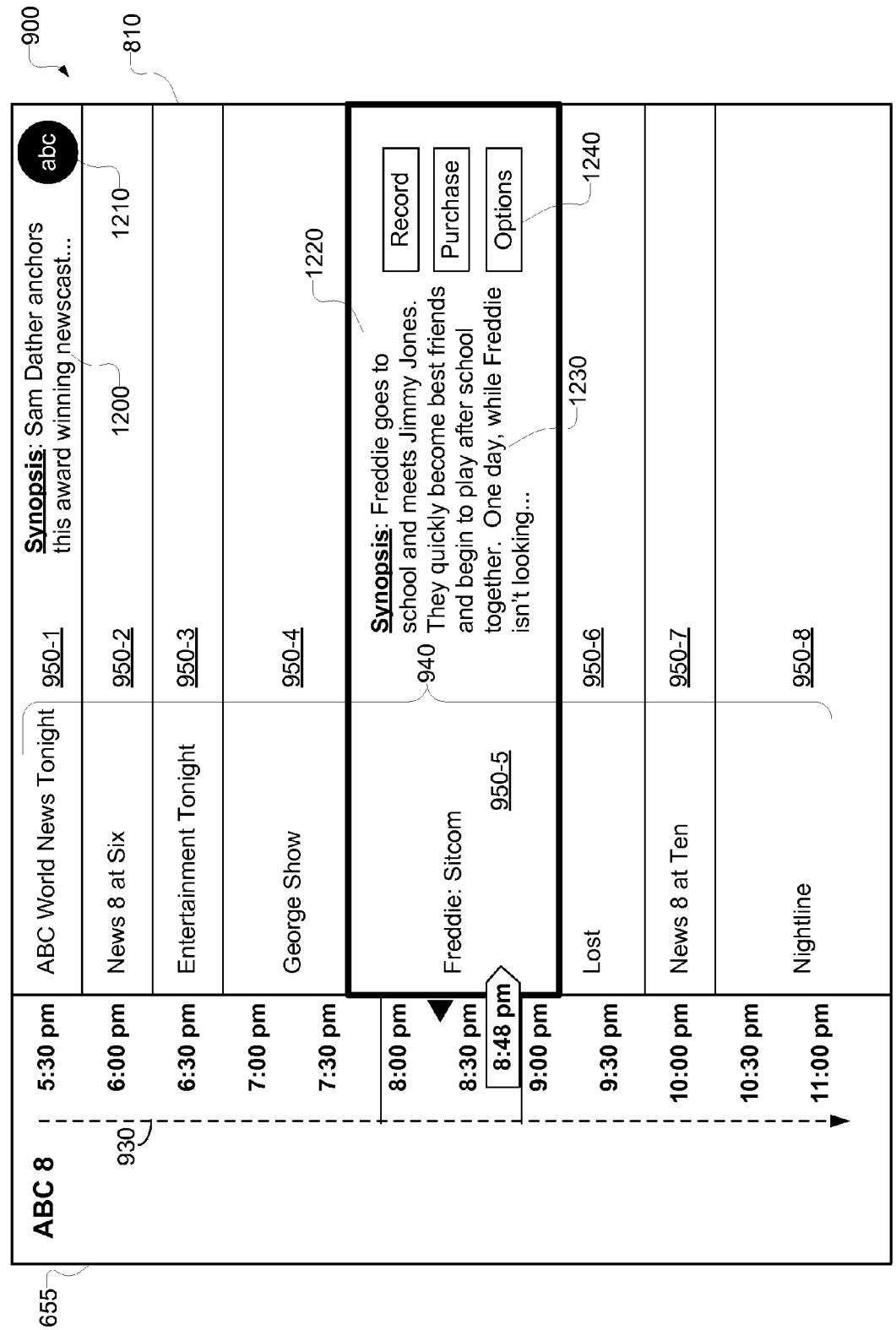
FIG. 12 shows an alternative view of program guide GUI after a content channel is selected according to principles described herein.

FIG. 12 shows an alternative view of program guide GUI 900 after content channel "ABC 8" shown in FIG. 9 has been selected. As shown in FIG. 12, the contents of second viewing pane 720 have been expanded (as compared to FIG. 11) to occupy substantially the entire viewing area 655. In this manner, relatively wider blocks 950 may be displayed within program guide GUI 900, thus allowing enhanced program guide information to be displayed for one or more media content instances shown within list 940.

To illustrate, block 950-1 shown in FIG. 12 includes a synopsis 1200 and a graphical logo 1210 corresponding to the media content instance "ABC World News Tonight." Blocks 950 may include additional or alternative program information as may serve a particular application. In some examples, the program information provided within blocks 950 is customizable.

In some examples, a selector object 1220 may be included within the view shown in FIG. 12. Selector object 1220 may be similar to the other selector objects 740 and 1100 described herein in that it borders, highlights, and/or distinguishes a particular block 950 from the other blocks. In some examples, the size of a particular block (e.g., 950-5) that is located within selector object 1220 may be accentuated so as to allow additional content corresponding to the block's media content instance to be displayed therein.

To illustrate, block 950-5 is shown to be within selector object 1220 in FIG. 12. As shown in FIG. 12, the size of block 950-5 has been accentuated slightly so as to allow content such as a synopsis 1230 and one or more selectable graphics 1240 to be displayed therein. It will be recognized that additional or alternative content may be displayed within a block (e.g., block 950-5) located within selector object 1220 as may serve a particular application.

In some examples, selector object 1220 may be configured to remain stationary in relation to list 940, which may be configured to scroll through selector object 1220. In some alternative examples, selector object 1220 is configured to move up and down in response to user input. For example, if a user presses the up navigation button 447, selector object 1220 may be configured to move up to select a block directly above a currently selected block.

In some examples, a user may access (e.g., view) a particular media content instance by pressing a designated selection button (e.g., select button 449 or right navigation button 446) when a block 950 corresponding to the particular media content instance is located within selector object 1220.

A user may desire to return to a previously displayed view of program guide GUI 900. To this end, the user may press a designated button (e.g., left navigation button 445) one or more times to return to the desired view. It will be recognized and additional or alternative methods may be used to return to a previously displayed view of program guide GUI 900.

Figure 13:
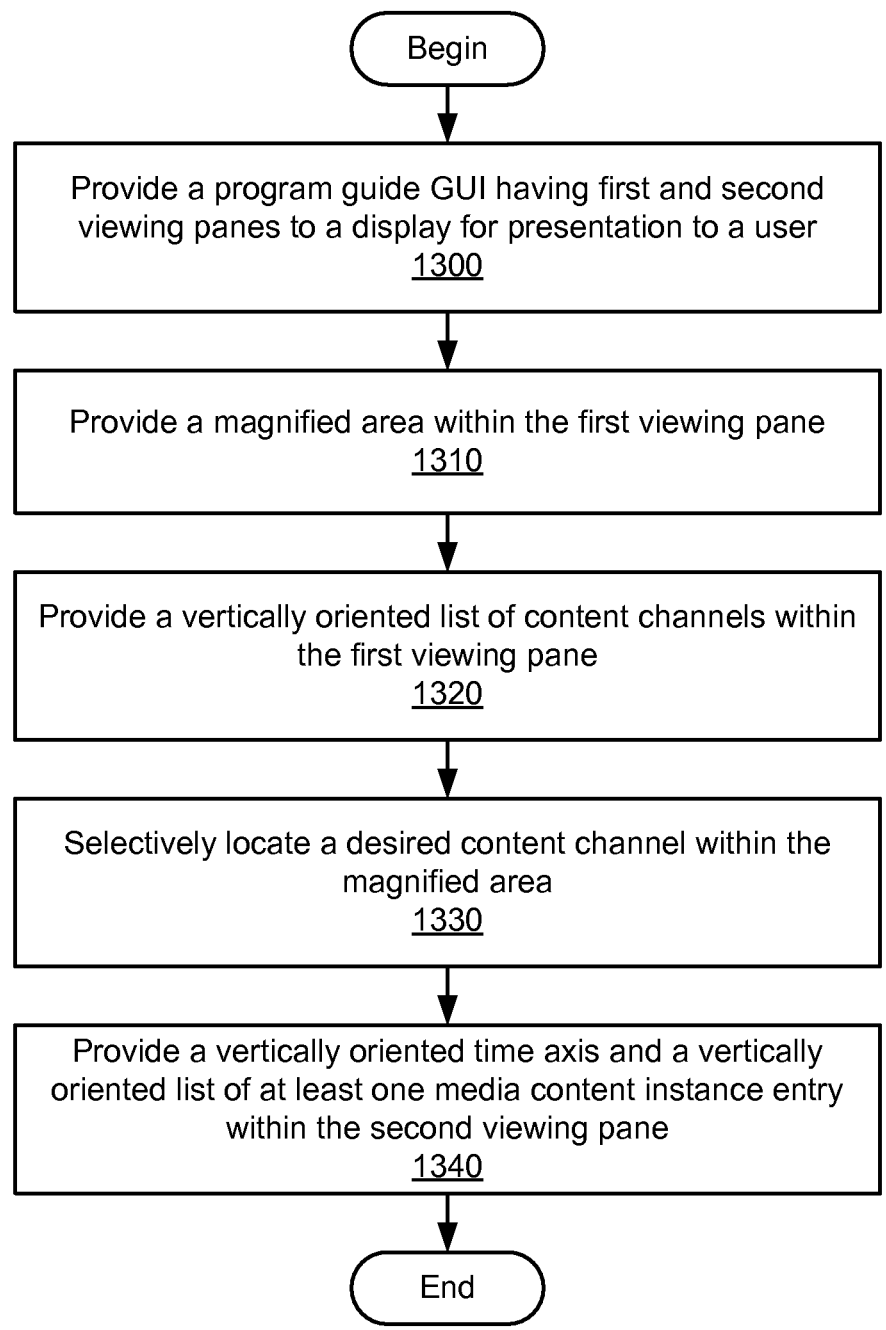
FIG. 13 illustrates an exemplary method of providing a vertically oriented program guide view according to principles described herein.

FIG. 13 illustrates an exemplary method of providing a vertically oriented program guide view. While FIG. 13 illustrates exemplary steps according to one embodiment, other embodiments may omit, add to, reorder, and/or modify any of the steps shown in FIG. 13.

In step 1300, a program guide GUI having first and second viewing panes is provided to a display for presentation to a user. Step 1300 may be performed in any of the ways described herein, including media content processing subsystem 110 providing the program guide GUI to display 112.

In step 1310, a selector object is provided within the first viewing pane. The selector object may be provided in any of the ways described herein.

In step 1320, a vertically oriented list of content channels is provided within the first viewing pane. Step 1320 may be performed in any of the ways described herein.

In step 1330, a desired content channel is selectively located within the selector object. Step 1330 may be performed in any of the ways described herein.

In step 1340, a vertically oriented time axis and a vertically oriented list of at least one media content instance entry are provided within the second viewing pane. The at least one media content instance entry corresponds to at least one media content instance available via the content channel located within the selector object of the first viewing pane.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising: a media content processing subsystem comprising at least one processor configured to provide a program guide graphical user interface having at least a first viewing pane and a second viewing pane to a display for presentation to a user,
provide a first selector object within said first viewing pane,
provide a list of content channels within said first viewing pane, and
provide within said second viewing pane and in response to a content channel included in said list of content channels being moved into said first selector object:
a time axis comprising a plurality of consecutive time slots in a time period and arranged vertically and chronologically in said second viewing pane,
a plurality of vertically oriented graphical blocks corresponding to said plurality of consecutive time slots and representative of a plurality of media content instances available via said content channel during at least one of said plurality of consecutive time slots within said time period represented by said time axis, and
a second selector object;
wherein, when a first graphical block that is included in said plurality of graphical blocks is located within said second selector object of said second viewing pane, said media content processing subsystem is configured to:
display, within said first graphical block, enhanced program guide information corresponding to a media content instance included in said plurality of media content instances, said first graphical block representative of said media content instance; and
accentuate a size of said first graphical block to allow said enhanced program guide information to be displayed within said first graphical block.

2. The system of claim 1, wherein said media content processing subsystem is further configured to position said first graphical block within said second selector object in response to a user input command.

3. The system of claim 1, wherein said media content processing subsystem is further configured to provide a graphical object configured to indicate a current time and vertically scroll along said time axis.

4. The system of claim 1, wherein said time period represented by said time axis is user-definable.

5. The system of claim 1, wherein when another of said content channels is moved into said first selector object within said first viewing pane, said media content processing subsystem is further configured to update one or more contents of said second viewing pane.

6. The system of claim 1, wherein said media content processing subsystem comprises a set-top box.

7. The system of claim 1, wherein said media content processing subsystem is further configured to accentuate a size of a second graphical block of said plurality of graphical blocks when said second graphical block is within said second selector object of said second viewing pane.

8. The system of claim 1, wherein said media content processing subsystem is further configured to distinguish at least one of said plurality of graphical blocks corresponding to media content instances that have already been transmitted prior to a current time, using one or more of colors, shading and graphics.

9. An apparatus comprising: at least one processor; at least one facility configured to direct said at least one processor to
generate a program guide graphical user interface having at least a first viewing pane and a second viewing pane,
generate a first selector object within said first viewing pane,
generate a list of content channels within said first viewing pane, and
generate within said second viewing pane and in response to a content channel included in said list of content channels being moved into said first selector object:
a time axis comprising a plurality of consecutive time slots in a time period and arranged vertically and chronologically in said second viewing pane,
a plurality of vertically oriented graphical blocks corresponding to said plurality of consecutive time slots and representative of a plurality of media content instances available via said content channel during at least one of said plurality of consecutive time slots within said time period represented by said time axis, and
a second selector object; wherein, when a first graphical block that is included in said plurality of graphical blocks is located within said second selector object of said second viewing pane, said at least one facility is configured to direct said at least one processor to: display, within said first graphical block, enhanced program guide information corresponding to a media content instance included in said plurality of media content instances, said first graphical block representative of said media content instance; and accentuate a size of said first graphical block to allow said enhanced program guide information to be displayed within said first graphical block; and
an output driver configured to provide said program guide graphical user interface to a display for presentation to a user.

10. The apparatus of claim 9, wherein said at least one facility is further configured to direct said at least one processor to position said first graphical block within said second selector object in response to a user input command.

11. The apparatus of claim 9, wherein said at least one facility is further configured to direct said at least one processor to provide a graphical object configured to indicate a current time and vertically scroll along said time axis.

12. The apparatus of claim 9, wherein when another of said content channels is moved into said first selector object within said first viewing pane, said at least one facility is further configured to direct said at least one processor to update one or more contents of said second viewing pane.

13. The system of claim 9, wherein said at least one facility is further configured to direct said at least one processor to accentuate a size of a second graphical block of said plurality of graphical blocks when said second graphical block is within said second selector object of said second viewing pane.

14. The system of claim 9, wherein said at least one facility is further configured to direct said at least one processor to distinguish at least one of the plurality of graphical blocks corresponding to media content instances that have already been transmitted prior to a current time, using one or more of colors, shading and graphics.

15. A method comprising:
providing, by at least one computing device, a program guide graphical user interface having at least a first viewing pane and a second viewing pane to a display for presentation to a user;
providing, by the at least one computing device, a first selector object within said first viewing pane to said display for presentation to said user;
providing, by the at least one computing device, a list of content channels within said first viewing pane to said display for presentation to said user; and
providing within said second viewing pane, by the at least one computing device in response to one content channel of said list of said content channels being moved into said first selector object:
a time axis comprising a plurality of consecutive time slots in a time period and arranged vertically and chronologically in said second viewing pane, a plurality of vertically oriented graphical blocks corresponding to said plurality of consecutive time slots and representative of a plurality of media content instances available via said one content channel during at least one of said plurality of consecutive time slots within said time period represented by said time axis, and a second selector object; wherein, when a first graphical block that is included in said plurality of graphical blocks is located within said second selector object of said second viewing pane, said method further comprises: displaying, by the at least one computing device within the first graphical block, enhanced program guide information corresponding to a media content instance included in said plurality of media content instances, said first graphical block representative of said media content instance; and accentuating, by the at least one computing device, a size of said first graphical block to allow said enhanced program guide information to be displayed within said first graphical block.

16. The method of claim 15, further comprising updating one or more contents of said second viewing pane when another of said content channels is selectively located within said first selector object within said first viewing pane.

17. The method of claim 15, further comprising accentuating a size of a second graphical block of the plurality of graphical blocks when said second graphical block is within said second selector object of said second viewing pane.

18. The method of claim 15, further comprising distinguishing at least one of the plurality of graphical blocks corresponding to media content instances that have already been transmitted prior to a current time, using one or more of colors, shading and graphics.

\* \* \* \* \*